July 4, 1939.    L. G. TUBBS    2,165,079
REGULATING APPARATUS
Filed April 30, 1937
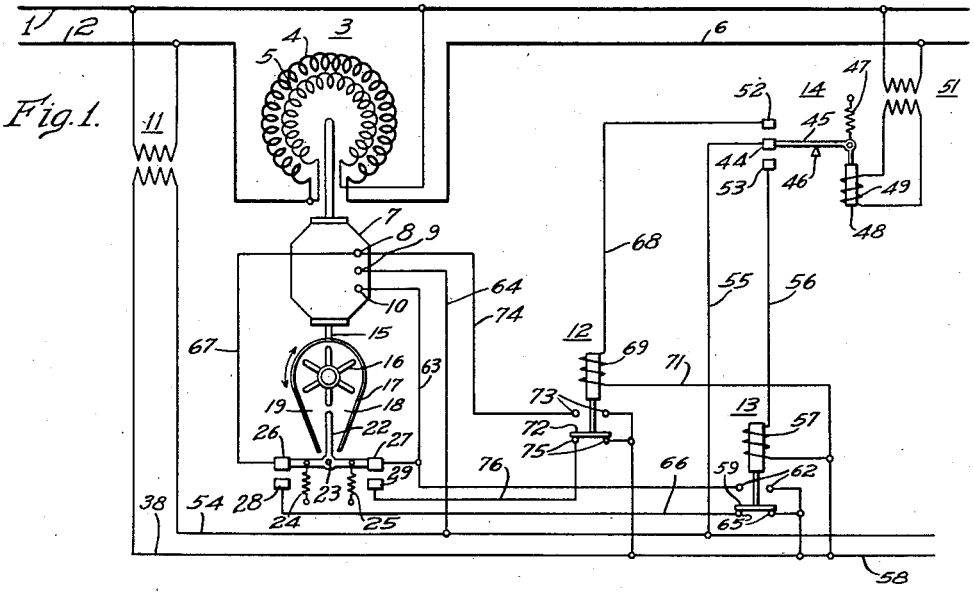
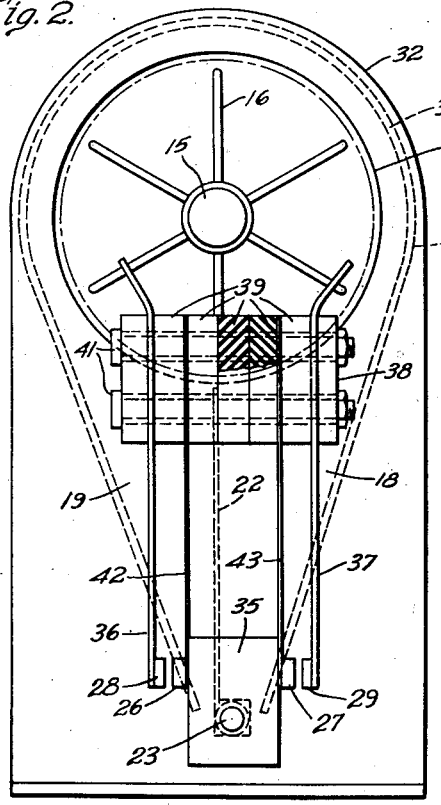
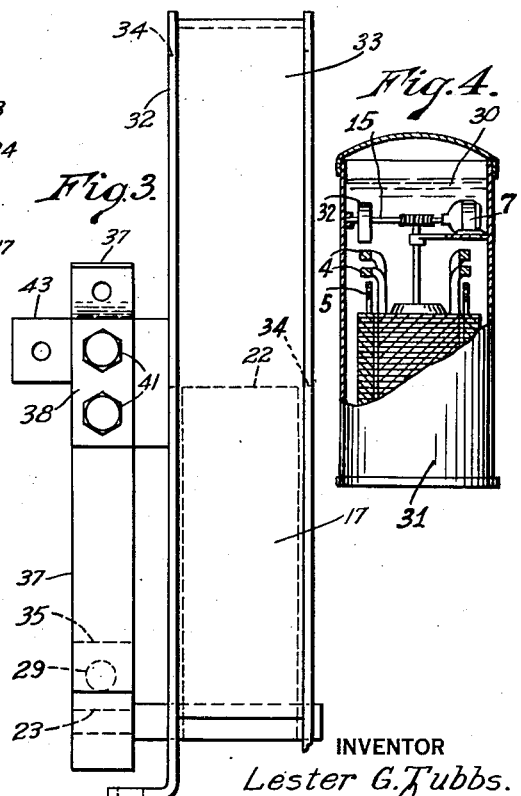
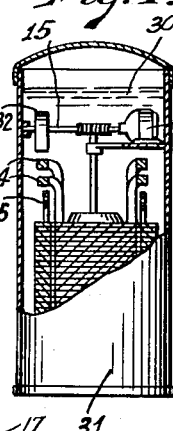
INVENTOR
Lester G. Tubbs.
BY
ATTORNEY Patented July 4, 1939

2,165,079

UNITED STATES PATENT OFFICE 2,165,079

REGULATING APPARATUS

Lester G. Tubbs, Wilkinsburg, Pa., assignor to Westinghouse Electric & Manufacturing Company, East Pittsburgh, Pa., a corporation of Pennsylvania Application April 30, 1937, Serial No. 139,933

5 Claims. (Cl. 171—119)

My invention relates to motor-operated regulating apparatus and more particularly to means for suddenly stopping the driving motor of such apparatus upon the interruption of the flow of power to the motor.

In many types of regulating apparatus, such as voltage regulators, the voltage adjusting mechanism is operated by a motor, controlled by a contact-making relay or equivalent means that is responsive to the regulated quantity. When so controlled it is desirable that the motor should start and stop promptly in response to changes in the regulated quantity as indicated by the operation of the primary relay controlling the regulating mechanism.

In certain types of induction voltage regulators it is customary to provide a braking mechanism of the friction type for stopping the motor and the operating mechanism associated therewith promptly upon the interruption of the motor driving circuit. Such braking mechanism is usually provided with biasing means for normally maintaining the brakes applied when the motor is deenergized, and with electrically energized releasing means that is operated upon the energization of the motor to release the brakes. Such mechanisms give good performance when the motor and its operating mechanism are placed outside of the tank provided for the regulating windings. Recently, voltage regulators for the general purpose indicated above have been provided in which the motor and the greater part of the mechanism through which the motor is operatively connected to the regulating windings are placed within the tank beneath the level of the oil that is customarily provided for insulating and cooling the windings. When the motor is so located, the problem of building a satisfactory brake mechanism of the friction type becomes a complicated one.

It is well known that a motor may be braked dynamically by reversing the connection of its leads to the power source to effect the supply of energy to the motor from the power source in a direction to create a motor torque in reverse direction to its direction of rotation. This operation is commonly termed "plugging" the motor.

Certain difficulties occur in plugging a motor, as above described, of the small size customarily employed in an induction voltage regulator or similar equipment because the inertia of the moving parts is so small that the duration of time, during which the reverse direction of power is required to be applied to the motor to bring it to a complete stop without reversing the direction of operation of the motor, is very short.

It is an object of my invention to provide means for stopping a motor by supplying power thereto in a direction to reverse the motor torque and for interrupting the current supplied to effect such a reverse motor torque upon the stopping of the motor.

It is another object of my invention to provide a dynamic braking system for motors that automatically supplies a motor reversing current to the motor upon the operation of the motor control relays to interrupt the motor propelling circuit, and that automatically interrupts the reversing current upon the stopping of the motor.

It is a further object of my invention to provide a system for supplying reverse current to a motor through circuits controlled in part by a fluid pressure operated switching means dependent upon the speed and direction of operation of the motor for stopping the motor in either direction of travel.

Other objects and advantages of my invention will be apparent from the following description of one preferred embodiment thereof, reference being had to the accompanying drawing, in which:

Figure 1 is a diagrammatic view of circuits and apparatus employed in a preferred embodiment of the invention;

Figs. 2 and 3 are end and side views, respectively, of the impeller mechanism connected to the motor shaft for controlling the motor plugging circuits; and Fig. 4 is a diagrammatic view of apparatus constructed in accordance with the invention.

Referring to Fig. 1 of the drawing, a supply circuit represented by conductors 1 and 2 is illustrated to which is connected an induction regulator 3 having the usual series winding 4 and shunt winding 5 that are inductively related to control the voltage across supply circuit conductors 1 and 6 by operation of a motor 7. The motor 7 is provided with three terminals 8, 9 and 10, through which power is supplied from a transformer 11 as controlled by secondary relays 12 and 13 in accordance with the operation of a primary relay 14 that is responsive to the regulated quantity. The motor 7 may be a well known split-phase type commonly employed to operate below the surface of insulating oil in an induction regulator.

A dynamic brake selecting or presetting switch device is provided employing an impeller or paddle 16 mounted on the motor shaft 15 within the upper substantially cylindrical portion of a guide wall 17, the lower ends of which converge in a V-shaped lower portion to provide two chambers 18 and 19 on opposite sides of a vane 22 that extends upwardly between the converging ends of the wall. The vane 22 is pivotally mounted on the pivot 23 and provided with springs 24 and 25 that normally bias the vane to its illustrated or mid-position. Movable switch contact members 26 and 27 are mounted to be actuated by the vane 22 to engage fixed contact members 28 and 29, respectively, upon movement of the vane 22 about the pivot 23 in a manner to be more fully explained.

The dynamic braking preset switching device shown diagrammatically in Fig. 1 will be better understood by reference to Figs. 2 and 3, in which an outer casing 32 is illustrated containing the guide wall 17 having a curved upper portion 33 surrounding the impeller 16 that is mounted on the motor shaft 15, and which is positioned opposite circular openings 34 in the outer casing 32. The vane 22 is shown in dotted lines in Figs. 2 and 3, mounted upon the pivot pin 23, to which is attached a rectangular cam 35 that moves with the vane 22. The outer or fixed contact members 28 and 29 are mounted upon relatively stiff supporting members 36 and 37 that extend downwardly from a supporting block 38 consisting of a plurality of fibre sections 39 operatively held together by supporting bolts 41 and between certain of which the members 36 and 37 are supported. The movable contact members 26 and 27 are mounted on flexible springs 42 and 43 extending downwardly from between certain of the sections 39 of the fibre supporting structure 38 and are biased toward each other to normally center the rectangular cam 35 and the vane 22 in its central or illustrated position. The motor 7 and the impeller mechanism within the casing 32 are disposed in a suitable tank 31 containing the regulator windings 4 and 5 and below the level of the insulating fluid 30 commonly provided.

Referring again to Fig. 1, the primary relay 14 comprises a movable contact member 44 carried by a lever 45 mounted on the pivot 46 and biased in one direction by a spring 47, and in the opposite direction by a core 48 that is energized by a winding 49 through a voltage transformer 51 in accordance with the voltage existing between feeder circuit conductors 1 and 6.

When the voltage between feeder circuit conductors 1 and 6 corresponds to the desired value for which the primary relay 14 is set, the lever 45 will be in its illustrated position and the contact member 44 will be spaced between the fixed relay contact members 52 and 53. If the voltage between feeder conductors 1 and 6 decreases, the pull on the core 48 correspondingly decreases and the spring 47 moves the lever 45 in a counter-clockwise direction about the pivot 46 to cause engagement of the contact member 44 with the contact member 53. A circuit is thus closed from the motor operating transformer 11 through conductor 54, conductor 55, contact members 44 and 53, conductor 56, winding 57 of the secondary relay 13 to conductor 58, and to the opposite terminal of the secondary winding of the transformer 11, thus energizing the relay 13 and causing the contact member 59 to be moved upwardly into engagement with the contact members 62 to close a motor operating circuit. This circuit extends from the supply conductor 58 through relay contact members 59 and 62, conductor 63, the motor winding connected between terminals 10 and 9 of the motor 7, and conductor 64 to the supply conductor 54 and causes the motor 7 to operate in a direction to raise the voltage between supply conductors 1 and 6. The described operation of the motor 7 rotates the impeller 16 in a clockwise direction, as viewed in Figs. 1 and 2, causing fluid to flow from the chamber 19 to the chamber 18 within the V-shaped guide 17, thus increasing the pressure on the right-hand side of the vane 22 as viewed in Figs. 1 and 2, to cause this vane to rotate about the pivot pin 23 in a counter-clockwise direction to bring the contact member 26 into engagement with the contact member 28. In Fig. 2, it will be noted that the upper left corner of the rectangular cam 35 urges the spring 42 carrying the contact member 26 toward the left to engage the contact member 28.

So long as the motor continues to operate at an appreciable speed, the contact members 26 and 28 are maintained in engagement. When the regulator 3 has been operated sufficiently to increase the voltage on the feeder circuit 1—6 to its desired value, the relay contact member 44 separates from the relay contact 53 and the circuit through the winding 57 of the secondary relay 13 is interrupted, thus permitting the relay 13 to drop to its lower or illustrated position, in which position the contact member 59 bridges the contact members 65, and closes the previously preset plugging circuit from the supply conductor 58 through relay contact members 59 and 65, conductor 66, the preset switch contacts 26 and 28, conductor 67, the motor winding connected between the motor terminals 8 and 9, and conductor 64 to the supply conductor 54 to supply energy to the motor 7 in a direction to reverse its torque and effect an immediate stopping of the motor. So long as the motor 7 continues to revolve at an appreciable speed, the effect of the impeller 16 will maintain the contact member 26 in engagement with the contact member 28, as above described, but as the motor 7 comes substantially to rest, the differences in the fluid pressure between the chambers 19 and 18 is decreased sufficiently that the centering springs 24 and 25, as viewed in Fig. 1, or springs 42 and 43, as viewed in Fig. 2, bias the vane 22 to its mid or illustrated position, thus separating the contact members 26 and 28 and interrupting the motor plugging circuit above traced.

If the voltage between supply conductors 1 and 6 rises above its desired value, the energization of the primary relay winding 49 increases to effect a pull on the core 48 exceeding that of the spring 47, thus causing the relay contact member 44 to engage the contact member 52. A circuit is thus completed from the supply conductor 54 through conductor 55, contact members 44 and 52, conductor 68, the relay winding 69 and conductor 71 to the supply conductor 58 to operate the secondary relay 12 to its upper circuit closing position, bringing the contact member 72 into engagement with the contact members 73 to close a motor operating circuit. This circuit extends from the supply conductor 58 through the relay contact members 72 and 73, conductor 74, the motor winding connected between terminals 8 and 9, and conductor 64 to the supply conductor 54 to cause operation of the motor 7 in a direction to decrease the voltage between feeder circuit conductors 1 and 6. This operation of the motor 7 in a voltage lowering direction causes the impeller 16, as viewed in Figs. 1 and 2, to revolve in a counter-clockwise direction, thus decreasing the fluid pressure in the chamber 18 and increasing the fluid pressure in the chamber 19 to cause the vane 22 to move in a clockwise direction, as viewed in Figs. 1 and 2, causing engagement of the contact members 27 and 29 to preset a motor plugging circuit that is completed when the relay 12 drops from its motor operating to its dynamic braking position.

When the voltage between feeder conductors 1 and 6 is adjusted to the desired value, the bias of the core 48 again equals the bias of the spring 47, causing the contact member 44 to separate from the contact member 52 and interrupt the above-traced circuit through the winding 69 of secondary relay 12, causing this relay to drop from its upper or motoring position to its lower or illustrated position, thus completing a motor plugging circuit to reverse the torque of the motor 7. This circuit extends from the supply conductor 58 through relay contact members 72 and 75, conductor 76, the preset switch contact members 29 and 27, conductor 63, through the motor winding connected between terminals 10 and 9, and conductor 64 to the supply conductor 54. Thus energized, a motor torque is developed counter to its direction of rotation to dynamically brake the motor. So long as the motor speed is appreciable, the differential pressures between chambers 18 and 19 maintain the motor plugging circuit closed through contact members 27 and 29, as above traced, and as the motor speed is reduced to substantially zero, the reduction in the differential pressures between the chambers 18 and 19 permits the centering springs 24 and 25 in the diagrammatic illustration in Fig. 1, and illustrated as the flat contact carrying springs 42 and 43 in Fig. 2, to move the vane 22 in a counter-clockwise direction to its mid or illustrated position, thus separating the contact members 27 and 29 and interrupting the motor plugging circuit.

It will be appreciated that the above described motor plugging circuit becomes automatically effective upon the deenergization of the directional relay 12 or 13, immediately completing a dynamic braking circuit through the appropriate preset switch contact members 26 and 28, or 27 and 29, to bring the motor to a quick stop, and that the motor plugging or dynamic braking circuit is interrupted just prior to the complete stopping of the rotation of the motor 7 in either direction.

Many modifications of my invention will be apparent to those skilled in the art without departing from the spirit of the invention, and I do not wish to be limited otherwise than by the scope of the appended claims.

I claim as my invention:

1. A directional switch device comprising an elongated casing providing a chamber that is rounded at one end, a shaft extending within the casing and mounted for rotation therein, an impeller in the rounded end of said chamber that is actuated in accordance with the direction and speed of said shaft, a vane pivotally supported adjacent the other end of said chamber and extending within the casing toward said impeller, said impeller serving to pump fluid from the one side to the other side of said vane for actuating said vane in the one or the other direction in accordance with the direction of operation of said motor, means for biasing said vane to a mid position, and switch means for closing one of two preset circuits upon movement of said vane in the one or the other direction from its mid position in response to the rotation of said impeller.

2. In a motor driven electrical apparatus, in combination, a motor, a pair of directional relays for controlling the operation of the motor in the one or the other of two directions of rotation, a preset motor plugging switch device comprising a pair of chambers separated by a movable partition, and a rotary pump operated in the one or the other direction in accordance with the direction of rotation of the motor to pump fluid from the one side to the other of said chambers, means for biasing said partition to a predetermined position when the rotary pump is at rest, and a switch device including two switches responsive to the movement of said partition in the one or the other direction from said predetermined position for presetting the one or the other of two preset plugging circuits and means responsive to the movement of a directional relay to a motor interrupting position to complete the plugging circuit, said preset switch device being effective upon the stopping of the rotary pump to interrupt said plugging circuit.

3. In combination, regulating apparatus comprising a tank, an insulating fluid therein, electric circuit adjusting mechanism contained within said tank, means of operating said adjusting means including an electric motor contained within said tank and immersed in said fluid, motor controlling means including a pair of directional relays for controlling the operation of the motor in the one or in the other of two directions of rotation, means comprising a switch device having two circuit closing positions for selecting one of two motor plugging circuits, biasing means for urging said device to a circuit interrupting position, and fluid pumping means immersed in said insulating fluid for forcing fluid to move said switch device to the one or the other of its circuit closing positions depending upon the direction of rotation of the motor, and means for completing said motor plugging circuit upon operation of a directional relay from its motoring position.

4. In combination, regulating apparatus comprising a tank, an insulating fluid therein, electric circuit adjusting mechanism contained within said tank, means of operating said adjusting means including an electric motor contained within said tank and immersed in said fluid, motor controlling means including a pair of directional relays for controlling the operation of the motor in the one or in the other of two directions of rotation, a preset motor plugging switch device comprising a pair of chambers separated by a movable partition normally biased to an intermediate position, a rotary pump operated in the one or the other direction in accordance with the direction of rotation of the motor to pump fluid from one to the other of said chambers, and two switches for presetting the one or the other of two motor plugging circuits upon the movement of said partition from its intermediate position in response to the direction if rotation of said pump, and means responsive to the operation of a directional relay from its motoring position for completing the plugging circuit, said preset switch device being effective upon the stopping of the rotary pump to interrupt the plugging circuit.

5. In combination, regulating apparatus comprising a tank, an insulating fluid therein, electric circuit adjusting mechanism contained within said tank, means for operating said adjusting means including an electric motor contained within said tank and immersed in said fluid, motor controlling means including a pair of directional relays for controlling the operation of the motor in the one or in the other of two directions of rotation, and each having a motoring and a braking position, means comprising a preset switch device including a rotary pump operating in said insulating fluid in the one or the other direction in accordance with the direction of operation of said motor, and switch means operated by said pump to a selected one of two circuit closing positions upon operation of the motor in the one or the other direction for selecting a dynamic braking circuit that is completed upon operation of the motor controlling directional relay from its motoring to its braking position, said preset switch device being effective to interrupt the braking circuit when the rotary pump comes substantially to rest.

LESTER G. TUBBS.